Patented Sept. 26, 1944

2,359,020

UNITED STATES PATENT OFFICE 2,359,020

RECOVERY OF VALUABLE HYDROCARBONS

Frederick W. Breuer, Haverford, Pa., assignor to The United Gas Improvement Company, a corporation of Pennsylvania No Drawing. Application July 12, 1940, Serial No. 345,101

6 Claims. (Cl. 260—681.5)

This invention relates to improvements in the preparation of $C_5$ diolefins in practically pure form by combination with solid dry heavy metal salts, of groups 1 and 2 of the periodic system. The prior art on the separation of diolefins by means of cuprous salts has dealt with solutions of cuprous salts and cuprous salt complexes in aqueous and non-aqueous media. These processes are subject to serious difficulties both because of the relative instability of these types of absorbents as well as because of their corrosive action upon reactors made of iron or other commonly used construction metals. Furthermore, the separation of diolefins from the olefins in mixtures such as formed in cracking operations by means of cuprous salts and their complexes when dissolved in aqueous or non-aqueous media is incomplete, because these systems are known to dissolve or absorb considerable amounts of monoolefins more or less firmly.

Modifications of the separation process of diolefins applying soluble cuprous complexes have necessitated the use of large excesses of solubilizing agents, such as chlorides of the alkali and alkaline earth metals or amine salt thereby decreasing the efficiency of the process and the utilization of the cuprous chloride, because an equilibrium according to the following equation:

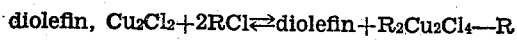

diolefin, $Cu_2Cl_2 + 2RCl \rightleftharpoons$ diolefin $+ R_2Cu_2Cl_4$—R

R representing alkali or alkaline earth metal or an amine radical—is established. Although the deleterious action of excess RCl can be eliminated to a certain extent by the addition of undissolved cuprous chloride, filtration and pumping problems in a continuous process are made considerably more difficult and costly.

It has now been found that separation of $C_5$ diolefins from other substances can be effected more economically and in a higher degree of purity by solid salts in the absence of a liquid dissolving or suspending medium.

Whereas e. g. the dissociation pressure of a diolefin cuprous chloride adduct is of the order of a few millimeters mercury, the corresponding dissociation pressures for ethylene, propylene and butylene additive compounds are about 2 atmospheres or higher. When working at atmospheric pressures monoolefins are therefore not absorbed on dry solid cuprous chloride and a highly selective absorption and separation of diolefins is effected. Vice versa, monoolefins free of diolefins are obtained. The manufacture of diolefins free of impurities such as monoolefins and of monoolefins free of diolefins is of great practical importance.

The mentioned absorbing substances are applied as finely divided powders or suspended or precipitated on suitable carriers, such as diatomaceous earth and other materials which under the conditions of operation do not act upon the $C_5$ diolefins and accompanying bodies.

Example 1

In a suitable reaction vessel 173.6 parts by weight of a liquid hydrocarbon cut, containing 65% by weight of piperylene are added in portions to 600 parts by weight of dry powdered cuprous chloride, care being taken to dissipate the heat of reaction by means of suitably arranged cooling. After one and one half hours of thorough mixing the unreacted hydrocarbons are boiled off and subsequently the piperylene cuprous chloride complex is decomposed by heating to 65° C. with a final reduction of pressure to 400 mm. Hg. An excellent yield of 100% piperylene is obtained. It is advisable to apply temperatures not higher than 110° C. in order to avoid secondary reactions.

Example 2

80 parts by weight of a fraction of cracked hydrocarbon material boiling essentially between 30 and 36° C. and containing 57.5% by weight of isoprene, is reacted in the liquid phase with 600 parts by weight of dry finely powdered cuprous chloride under the conditions described in Example 1. After separation of the unreacted portion, practically pure isoprene is recovered by heat decomposition of the yellowish green isoprene cuprous chloride complex.

I may also treat said mixtures with solid dry complexes of salts of heavy metals of groups 1 and 2 of the periodic system with salts of alkali metals, alkaline earths, ammonia, and/or substituted amines, followed by liberation of the $C_5$ diolefins from the resulting additive compounds.

If desired the foregoing complexes may be mixed, deposited or precipitated on solid finely divided substances of large surface area which under the conditions obtaining do not act upon $C_5$ diolefins and/or accompanying substances.

Having particularly described my invention it is to be understood that this is by way of illustration and that changes, omissions, additions, substitutions and/or modifications might be made within the scope of the claims without departing from the spirit thereof.

I claim:

1. A process for the recovery of a $C_5$ diolefine material from a mixture thereof containing other hydrocarbons which comprises contacting said mixture in the liquid phase with a solid dry complex of a salt of a heavy metal of groups I and II of the periodic system with a salt selected from the group consisting of salts of alkali metals, alkaline earth metals, ammonia and substituted amines, and under conditions of temperature and pressure such that said complex forms an addition compound with said $C_5$ diolefine material to the substantial exclusion of other than diolefine components of the mixture, separating said addition compound from the remaining mixture, and liberating said $C_5$ diolefine material from said addition compound with the aid of heat.

2. A process for the recovery of a $C_5$ diolefine material from a mixture thereof containing other hydrocarbons which comprises contacting said mixture in the liquid phase with a solid dry complex of cuprous chloride with a salt selected from the group consisting of salts of the alkali metals, alkaline earth metals, ammonia and substituted amines, and under conditions of temperature and pressure such that said complex forms an addition compound with said $C_5$ diolefine material to the substantial exclusion of other than diolefine components of the mixture, separating said addition compound from the remaining mixture, and liberating said $C_5$ diolefine material from said addition compound with the aid of heat.

3. A process for the recovery of isoprene from a mixture thereof containing other hydrocarbons which comprises contacting said mixture in the liquid phase with a solid dry complex of a salt of a heavy metal of groups I and II of the periodic system with a salt selected from the group consisting of salts of alkali metals, alkaline earth metals, ammonia, and substituted amines, and under conditions of temperature and pressure such that said complex forms an addition compound with said isoprene to the substantial exclusion of other than diolefine components of the mixture, separating said addition compound from the remaining mixture, and liberating said isoprene from said addition compound with the aid of heat.

4. A process for the recovery of isoprene from a mixture thereof containing other hydrocarbons which comprises contacting said mixture in the liquid phase with a solid dry complex of cuprous chloride with a salt selected from the group consisting of salts of alkali metals, alkaline earth metals, ammonia, and substituted amines, and under conditions of temperature and pressure such that said complex forms an addition compound with said isoprene to the substantial exclusion of other than diolefine components of the mixture, separating said addition compound from the remaining mixture, and liberating said isoprene from said addition compound with the aid of heat.

5. A process for the recovery of piperylene from a mixture thereof containing other hydrocarbons which comprises contacting said mixture in the liquid phase with a solid dry complex of a salt of a heavy metal of groups I and II of the periodic system with a salt selected from the group consisting of salts of alkali metals, alkaline earth metals, ammonia, and substituted amines, and under conditions of temperature and pressure such that said complex forms an addition compound with said piperylene to the substantial exclusion of other than diolefine components of the mixture, separating said addition compound from the remaining mixture, and liberating said piperylene from said addition compound with the aid of heat.

6. A process for the recovery of piperylene from a mixture thereof containing other hydrocarbons which comprises contacting said mixture in the liquid phase with a solid dry complex of cuprous chloride with a salt selected from the group consisting of salts of alkali metals, alkaline earth metals, ammonia, and substituted amines, and under conditions of temperature and pressure such that said complex forms an addition compound with said piperylene to the substantial exclusion of other than diolefine components of the mixture, separating said addition compound from the remaining mixture, and liberating said piperylene from said addition compound with the aid of heat.

FREDERICK W. BREUER.